June 30, 1931.  C. E. BERGGREN  1,812,768
TRAILER COUPLING
Filed June 27, 1930  2 Sheets-Sheet 1

INVENTOR.
Charles E. Berggren,
BY
Geo. P. Kimmel
ATTORNEY.

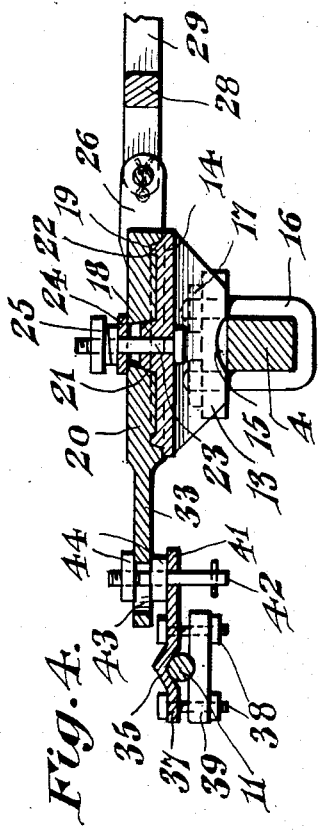

Patented June 30, 1931

1,812,768

UNITED STATES PATENT OFFICE

CHARLES EMIL BERGGREN, OF WILCOX, NEBRASKA

TRAILER COUPLING

Application filed June 27, 1930. Serial No. 464,394.

This invention relates to a trailer coupling for connecting a trailer of the four wheel type to the propelling means therefor, such as a truck, and has for its primary object to provide, in a manner as hereinafter set forth, a device for the purpose aforesaid, by means of which any lateral movement of the propelling vehicle will cause the transmission of a corresponding movement to the trailer, and by means of which any vertical vibratory movement of the propelling vehicle will be absorbed without being transmitted to the trailer.

A further object of the invention is to provide a trailer coupling of the character aforesaid which includes as parts thereof, a supporting member for the front end of a trailer, and a pair of wheel supporting members swivelly connected with a tie rod extending therebetween and also swivelly connected with the trailer supporting member.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claim hereunto appended.

In the accompanying drawings in which like numerals are employed to designate like parts throughout the several views:—

Figure 3 is a bottom plan of the trailer coupling.

Figure 4 is a vertical section through the trailer coupling taken at a point indicated by the line 4—4 of Figure 3.

Figure 5 is a vertical section through a portion of the coupling taken at a point indicated by the line 5—5 of Figure 3.

Figure 6 is a vertical section through a portion of the trailer coupling taken at a point indicated by the line 6—6 of Figure 3.

Figure 7 is a sectional detail showing the connection between the trailer coupling and the propelling vehicle for the trailer.

Figure 1:
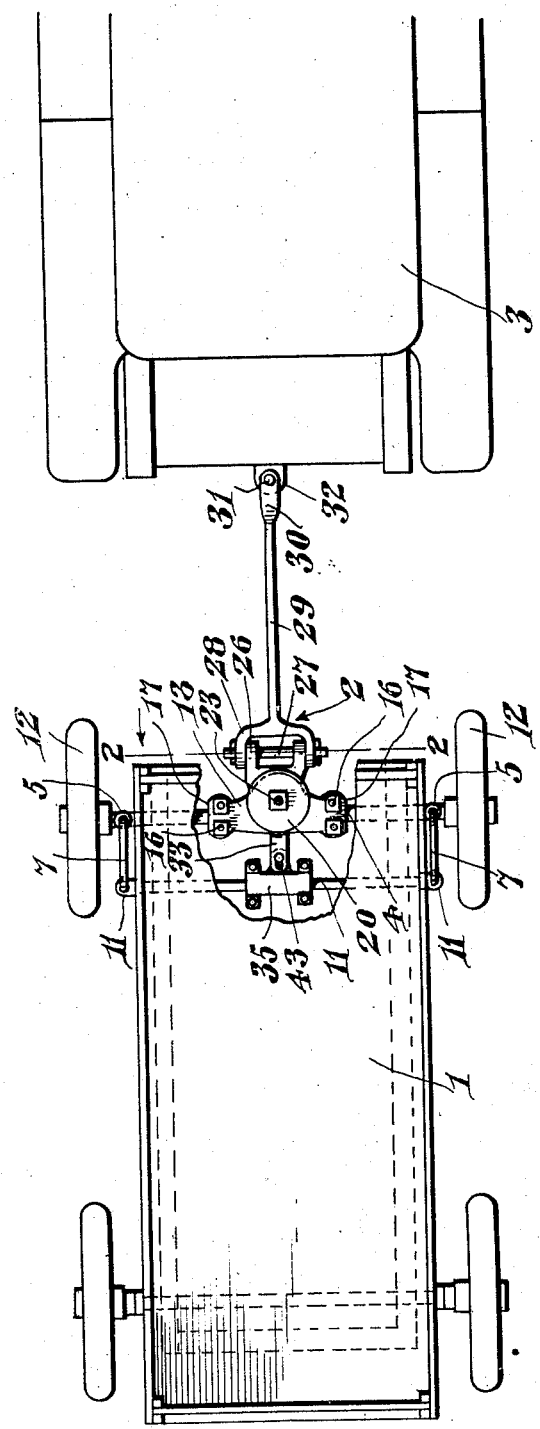
Figure 1 is a top plan of a trailer coupling in accordance with this invention, showing the same in operative position with respect to a trailer and truck.
Figure 2:
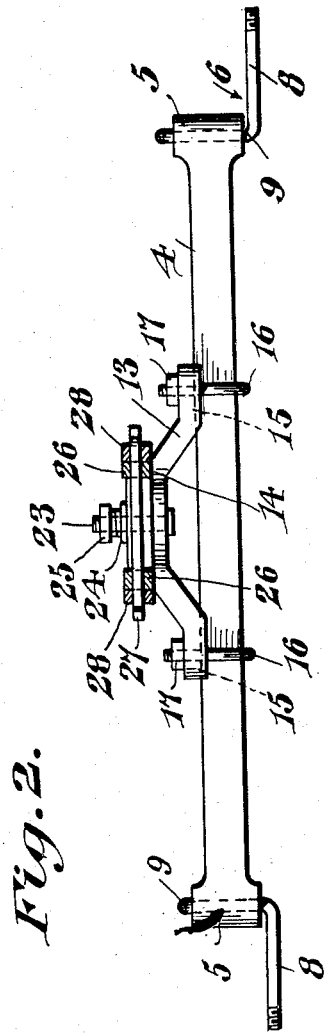
Figure 2 is a sectional elevation taken on line 2—2 of Figure 1.

Referring to the drawings in detail, the numeral 1 designates a trailer of the four wheel type which is connected by means of my improved trailer coupling indicated generally at 2 with a truck shown conventionally at 3.

The trailer coupling 2 includes a supporting member 4 for disposition beneath the forward end of the body of the trailer, transversely of the latter. The member 4 is formed at its ends with vertically disposed sleeves 5 which are swivelly connected with wheel supporting members indicated generally at 6. Each of the wheel supporting members 6 consists of an upper portion 7, a lower portion 8, and an intermediate portion 9 connecting the portions 7 and 8. The intermediate portion 9 is vertically disposed and is rotatably mounted within one of the sleeves 5 of the supporting member 4. The upper portion 7 of each wheel supporting member 6 extends rearwardly from a sleeve 5 and terminates in an upturned free end portion 10 which rotatably extends through an apertured end portion of a tie rod 11. The tie rod 11 extends in parallel relation to the supporting member 4 and is apertured adjacent each end for the reception therethrough of the upturned portions 10 of the supporting members 6. The lower portion 8 of each supporting member 6 projects laterally at a right angle to the intermediate portion 9, and also at a right angle to the vertical plane of the upper portion 7. Rotatably mounted on the lower portions 8 of the supporting members 6 are the front wheels 12 of the trailer.

Seated on the supporting member 4 is an elongated plate 13 which is disposed longitudinally of the supporting member. The plate 13 is provided centrally thereof with a raised portion 14 which is of materially greater width than the end portions of the plate. The end portions of the plate 13 are slightly concave as indicated at 15 for the reception therein of the upper face of the supporting member 4. The plate 13 is secured in position on the supporting member 4 by means of a pair of U-bolts 16 which embrace the supporting member 4, and the end portions of which extend through spaced openings in the end portions of the plate 13. Threaded on the end portions of the U-bolts 16 are suitable nuts 17 which bear against the upper faces of the end portions of the plate 13. Projecting from the upper face of the central portion 14 of the plate 13 is a circular boss 18, and arranged in concentric relation to the boss 18 is an upstanding, annular rib 19.

Rotatably mounted on the central portion 14 of the plate 13 is a connecting element 20, the central portion of which is substantially circular in formation, and is formed centrally thereof with an upwardly tapering opening 21 within which the boss 18 extends. Formed in the lower face of the central portion of the element 20 is a groove 22 which is arranged concentrically of the opening 21 and has the rib 19 projecting thereinto. The connecting element 20 is secured in position with respect to the plate 13 by means of a bolt 23 which extends through aligned openings in the boss 18 and central portions 14 of the plate 13. The bolt 23 is provided with a suitable washer 24 and nut 25.

The connecting element 20 is formed with a pair of spaced ears 26 which project forwardly from the central portion of the connecting element and which are pivotally connected by means of a horizontally disposed bolt 27 with the bifurcated rear end 28 of a tongue 29. The tongue 29 is formed with a bifurcated forward end 30 which is connected by means of a vertically disposed bolt 31 with a lug 32 projecting from the rear end of the truck 3. It is to be noted that the tongue 29 provides a universal joint connection between the lug 32 and connecting element 20.

Projecting rearwardly from the central portion of the connecting element 20 is an arm 33 which is pivotally connected with a clamp indicated generally at 34 which is secured to the tie rod 11. The clamp 34 includes an elongated plate 35 which is seated on and extends lengthwise of the tie rod 11. The plate 35 is formed with a concaved lower face 36 for the reception therein of a peripheral portion of the tie rod 11. At the ends thereof the plate 35 is provided with laterally projecting apertured ears 37 which are connected by means of bolts 38 with elongated plates 39 which extend beneath the tie rod 11 transversely of the latter. The plates 39 are provided in their upper faces with transversely extending grooves 40 for the reception therein of peripheral portions of the tie rod 11. Centrally thereof, the plate 35 is formed with a forwardly projecting, apertured ear 41 which is connected with the arm 33 by means of a suitable bolt 42. The bolt 42 extends through the apertured ear 41 and further extends through an elongated slot 43 formed in the arm 41 adjacent the rearward end of the latter. The bolt 42 is rotatable with respect to the ear 41 and is stationary with respect to the arm 33, being held stationary with respect to the latter by means of a pair of lock nuts 44 which are threaded on the bolt 42 and which respectively bear against the upper and lower faces of the arm 33. It is to be noted that the connecting element 20 provides a universal joint connection between the tongue 29 and clamp 34.

In the operation of the trailer coupling, any lateral movement of the truck 3 such as caused by turning corners or by following a winding road will be transmitted through the tongue 29, connecting element 20, clamp 34, and tie rod 11 to the wheel supporting members 6 whereby the wheels 12 will be turned in the same direction as that taken by the truck. Any vibratory movement of the truck in a vertical direction, such as may be caused by running over bumps in the road, will be absorbed by the pivotal connection between the bifurcated end 28 of the tongue and the ears 26 projecting forwardly from the connecting element 20. It is to be noted that the engagement of the boss 18 and ribs 19 on the central portion of the plate 13 with the opening 21 and groove 22 respectively in the connecting element 20 permits a free rotatable movement of the element 20 with respect to the plate 13 without any strain on the bolt 23 connecting the element 20 with the plate 13.

It is thought that the many advantages of a trailer coupling in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claim.

What I claim is:—

In a trailer coupling for connecting a trailer with a propelling vehicle, a cross bar for supporting the forward end of the trailer, a pair of wheel supporting members swivelly connected with the cross bar, a tie rod having its ends pivotally connected with the wheel supporting members, a plate seated on and fixedly secured to the cross bar, a tapered boss projecting upwardly from said plate centrally of the latter, an annular rib projecting upwardly from the plate in concentric relation to said boss, a connecting element having an upwardly tapered recess to receive said boss, said connecting element having its lower face formed with an annular groove arranged concentrically of said recess to receive said rib, a coupling bolt extending through said boss and recess and having a washer bearing against the upper face of the connecting element to rotatably connect the latter, a clamp secured to the tie rod, means pivotally connecting the clamp and said connecting element, and a tongue having one end pivotally connected with said connecting element and having its other end pivotally connected with the propelling vehicle.

In testimony whereof, I affix my signature hereto.

CHARLES EMIL BERGGREN.